(12) United States Patent
Zhao et al.

(10) Patent No.: US 8,110,619 B2
(45) Date of Patent: Feb. 7, 2012

(54) TIRE COMPOUNDS WITH IMPROVED TEAR, FLEX FATIGUE, AND OZONE RESISTANCE

(75) Inventors: Junling Zhao, Hudson, OH (US); Paul Harry Sandstrom, Cuyahoga Falls, OH (US); Aaron Scott Puhala, Kent, OH (US); Richard Michael D'Sidocky, Ravenna, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 286 days.

(21) Appl. No.: 12/201,748

(22) Filed: Aug. 29, 2008

(65) Prior Publication Data

US 2010/0056670 A1 Mar. 4, 2010

(51) Int. Cl.
*C08J 3/20* (2006.01)

(52) U.S. Cl. .......... 523/351; 524/91; 524/100; 524/105; 524/514

(58) Field of Classification Search .................. 523/351; 524/91, 100, 105, 514
See application file for complete search history.

(56) References Cited

U.S. PATENT DOCUMENTS

| | | | |
|---|---|---|---|
| 2,388,035 A | 2/1942 | Frosch | |
| 4,240,487 A | 12/1980 | Lal et al. | |
| 4,790,365 A | 12/1988 | Sandstrom et al. | |
| 4,913,209 A | 4/1990 | Hong et al. | |
| 4,996,263 A * | 2/1991 | Pyke et al. | 525/178 |
| 5,006,603 A | 4/1991 | Takaki et al. | |
| 5,049,610 A | 9/1991 | Takaki et al. | |
| 5,216,066 A | 6/1993 | Sandstrom et al. | |
| 5,341,863 A | 8/1994 | Sandstrom et al. | |
| 5,964,969 A | 10/1999 | Sandstrom et al. | |
| 6,255,372 B1 | 7/2001 | Lin et al. | |
| 6,274,676 B1 | 8/2001 | Lin et al. | |
| 6,391,971 B1 | 5/2002 | Teratani | |
| 6,455,638 B2 | 9/2002 | Laughner et al. | |
| 6,541,551 B1 | 4/2003 | Durairaj et al. | |
| 6,602,954 B1 | 8/2003 | Lin | |
| 6,776,206 B1 | 8/2004 | Segatta et al. | |
| 6,807,995 B1 | 10/2004 | Majumdar et al. | |
| 7,112,251 B2 | 9/2006 | Majumdar et al. | |
| 7,249,621 B2 | 7/2007 | Sandstrom | |
| 7,259,199 B2 | 8/2007 | Sandstrom | |
| 2004/0129388 A1 | 7/2004 | Brazil | |
| 2005/0090616 A1 * | 4/2005 | Dias et al. | 525/191 |
| 2005/0109440 A1 | 5/2005 | Majumdar et al. | |
| 2005/0234165 A1 | 10/2005 | Schaal et al. | |
| 2006/0021688 A1 | 2/2006 | Sandstrom | |
| 2006/0041071 A1 | 2/2006 | Sandstrom | |
| 2006/0167184 A1 | 7/2006 | Waddell et al. | |
| 2007/0142509 A1 | 6/2007 | Sandstrom | |
| 2007/0155889 A1 | 7/2007 | Okamoto et al. | |
| 2007/0179247 A1 | 8/2007 | Sandstrom et al. | |
| 2008/0047647 A1 | 2/2008 | Raskas | |
| 2009/0151846 A1 * | 6/2009 | Zhao et al. | 152/564 |

FOREIGN PATENT DOCUMENTS

| | | |
|---|---|---|
| EP | 0364389 A1 | 9/1989 |
| EP | 0364390 A1 | 9/1989 |
| EP | 2070727 A1 | 6/2009 |
| WO | 0069930 | 11/2000 |

OTHER PUBLICATIONS

European Patent Office, European Search Report in corresponding EP Application Serial No. 09168518.0-1214 dated Dec. 2, 2009, 6 pages.
Peter Maul, Barrier Enhancement Using Additives, Fillers, Pigments and Additives for Plastics in Packaging Applications, Pira International Conference, Dec. 5-6, 2005, Brussels, Belgium.
A.F. Younan, et al., Reinforcement of Natural Rubber with Nylon 6 Short Fibers, Journal of Applied Polymer Science, 1992, vol. 45, pp. 1967-1971, John Wiley & Sons, Inc.
Shin-Ichiro Goto, et al., A Novel Gas-Barrier Elastomer Composed of Butyl Rubber and Polyamide, Journal of Applied Polymer Science, 1999, vol. 74, pp. 3548-3552, John Wiley & Sons, Inc.

* cited by examiner

*Primary Examiner* — Peter D Mulcahy
(74) *Attorney, Agent, or Firm* — Wood, Herron & Evans, LLP

(57) ABSTRACT

A method of producing a tire including mixing in a non-productive phase at least one elastomer with a polyamide having a melting temperature of less than 180° C. The polyamide is allowed to heat to at least its melting temperature. During the productive phase, at least one curing agent is added to the elastomeric composition. The curing agent may be a sulfur containing curing agent and/or a non-sulfur containing curing agent. The elastomeric composition may optionally include a crystalline EPDM elastomer. The resulting compositions may then be formed into a tire component which may be built into a tire and cured.

16 Claims, No Drawings

TIRE COMPOUNDS WITH IMPROVED TEAR, FLEX FATIGUE, AND OZONE RESISTANCE

FIELD OF THE INVENTION

This invention relates to elastomeric compositions and methods of producing the elastomeric compositions comprising an elastomer and low melting temperature nylons, and, optionally, an EPDM elastomer, and a pneumatic rubber tire built using tire components made from such elastomeric compositions.

BACKGROUND OF THE INVENTION

Pneumatic rubber tires are conventionally built from tire components, such as the tread, sidewalls, belts, beads, innerliners, etc. having specific characteristics chosen to affect the performance and life of the tire. The tire components are generally comprised of different elastomeric compositions that provide the specific desired characteristics necessary for the tire. Some tire components, for example, tire sidewall layers, apex, treadbase, Extended Mobility Tire insert ("EMT insert"), wedge, gum strip, and wire coat, may be subjected to considerable flexing, scuffing, and/or atmospheric aging. These tire components necessitate elastomeric compositions having increased stiffness, and improved resistance to tearing, flex fatigue, and ozone.

Fatigue cracking of tire components, when it occurs, is usually due to continual flexing of the tire component as the tire is run under load at service conditions. Fatigue cracking may be exacerbated by atmospheric aging.

To prevent fatigue cracking and increase the stiffness of tire components that require greater stiffness, such as apex, EMT inserts, treadbase, etc., the elastomeric compositions that make up the tire components have conventionally been reinforced by incorporating large amounts of carbon black and/or silica into the compound and/or by increasing the state of cure. Unfortunately, these techniques offer only diminishing returns and can actually result in decreased resistance to flex fatigue and tear strength.

Of further concern, tire components exposed to the atmosphere, such as the visible outer layers of an elastomeric tire sidewall, may age somewhat prematurely as a result of, for example, weather aging. For example, weathering may prematurely age exposed tire components as a result of exposure to ultraviolet light, ozone, and/or high humidity. Antidegradants are conventionally mixed with the sidewall elastomer to counteract or retard such effects.

Tires having improved stiffness and resistance to tearing, flex fatigue, and ozone, have met with great market success. Then, it would be desirable to provide a tire comprised of components of longer lived elastomeric compositions and/or improved performance.

One technique to improve stiffness and resistance to tearing, flex fatigue, and ozone, is to incorporate different fillers into the elastomeric composition. One class of potential fillers are polyamides. Polyamides may be added to the elastomeric composition as particles such as fibers, spheres, or pellets. In order to achieve the full benefit of the polyamides, the particles must be melted to obtain adequate dispersal in the elastomeric composition and the polyamide must bond with the elastomeric component of the elastomeric composition.

Polyamides that have previously been incorporated in elastomeric compositions have had relatively high melting temperatures, generally in excess of 200° C. The high temperatures required to melt these polyamides can damage other components of the elastomeric composition. Thus, in order to prevent heat damage to the other elastomer components, a separate polyamide melting step is added to the elastomer compounding process, thereby decreasing efficiency and increasing cost.

Polyamide bonding to the elastomeric component of elastomeric composition using standard techniques may be sufficient for some applications, however, it may be desirable to improve the bonding for other applications. Standard curing techniques include the use of sulfur containing curing agents, heat, and pressure.

SUMMARY OF THE INVENTION

The present invention relates to a method of producing an elastomeric composition having increased stiffness, resistance to tearing, flex fatigue, and/or ozone, that may then be utilized in a pneumatic tire. In one embodiment, the method includes mixing, in a non-productive phase, at least one elastomer with a polyamide having a melting temperature of less than 180° C. The polyamide is allowed to heat to at least its melting temperature. During the productive phase, at least one curing agent, which may be a sulfur containing curing agent and/or a non-sulfur containing curative agent, is added to the elastomeric composition. The resulting composition may be then formed into at least one tire component, which may be built into a tire and cured.

In another embodiment, crystalline EPDM elastomer is blended with the at least one elastomer and the polyamide in the non-productive stage.

The elastomeric formulation may be used to form tire components such as sidewalls, apexes, treadbases, Extended Mobility Tire inserts ("EMT insert"), wedges, gum strips, and wire coat prior to forming the tire and curing.

DETAILED DESCRIPTION

When introducing elements of the present invention (e.g., the exemplary embodiments(s) thereof), the articles "a", "an", "the" and "said" are intended to mean that there are one or more of the elements. The terms "comprising", "including" and "having" are intended to be inclusive and mean that there may be additional elements other than the listed elements. The term "or" is understood to mean "and/or".

In accordance with this invention, at least one tire component requiring at least one of increased stiffness, fatigue resistance, and/or ozone resistance, is manufactured from an elastomeric composition that includes an elastomer, a low melting temperature polyamide, and, optionally, a crystalline EPDM elastomer. The at least one tire component may be a sidewall, apex, treadbase, Extended Mobility Tire insert ("EMT insert"), wedge, gum strip, and wire coat.

The term "phr" as used herein, relates to parts by weight of an ingredient per 100 parts by weight of rubber/elastomer. For the purposes of calculating the phr, optional crystalline EPDM elastomer content is not considered in determining the parts by weight of rubber.

The terms "rubber" and "elastomer", "cure" and "vulcanize," and "compound" and "composition" may be used interchangeably unless otherwise indicated.

The elastomer for use in the elastomeric composition of the present invention includes at least one natural or synthetic rubber/elastomer. For example, the elastomeric compound may include, but is not limited to, a polybutadiene elastomer, a styrene-butadiene elastomer, a polyisoprene elastomer, a conjugated diene-based elastomer, and blends thereof. In one embodiment, natural rubber, such as SMR-20 or SMR-5 is used. In another embodiment, cis 1,4-polybutadiene elastomer is used. In another embodiment, a SMR-20 or SMR-5 are used in combination of cis 1,4-polybutadiene elastomer.

In addition to the elastomer component, the elastomeric composition includes a low melting point polyamide or nylon. By low melting point polyamide, it is meant that the polyamide exhibits a relatively low melting temperature, sufficiently low to ensure melting and dispersion of the polyamide at temperatures used to mix the elastomeric composition, typically about 100° C. to about 180° C. Polyamides with melting point temperature of less than 180° C., or less than 160° C. and even less than 120° C. can be used in the present invention.

Suitable low melting point polyamides include various nylon copolymers, terpolymers, and multipolymers including but not limited to nylon 6/66/610, nylon 6/66/612, nylon 6/66/610/612, and the like. The melting point of such polyamides is dependent on the relative proportions of the monomers used in production of the polyamide, as described for example in U.S. Pat. No. 2,388,035, incorporated by reference herein in its entirety.

Examples of suitable low melting point polyamides commercially available are the Elvamide® series from DuPont, including but not limited to Elvamide® 8061, 8063, 8066, and 8023R.

The elastomeric composition may contain about 1 phr to about 100 phr of the polyamide. In one embodiment, the polyamide may be provided in a range of about 1 phr to about 50 phr or in a range of about 5 phr to about 30 phr. In another embodiment, the polyamide may be provided in a range of about 50 phr to about 100 phr or in a range of about 55 phr to about 80 phr.

In addition to the elastomeric component and the low melting temperature polyamide, the tire component may also include an optional crystalline EPDM elastomer. The optional crystalline EPDM elastomer is a terpolymer comprised of ethylene, propylene, and an unsaturated component, i.e., a non-conjugated diene. Any appropriate non-conjugated diene may be used in the terpolymer, including, for example, 1,4-hexadiene, dicyclopentadiene, or ethylidenenorbornene, and combinations thereof.

Crystalline EPDM has a higher ethylene/propylene ration than non-crystalline EPDM. Crystalline EPDM may have an ethylene/propylene ratio from at least 65/35 to about 15/85, and having an ethylene content in a range of from greater than 65 and up to about 85 weight percent, and a non-conjugated diene content in a range of about 2 to about 8 weight percent.

EPDM elastomers comprised of ethylene, a propylene, and a non-conjugated diene can be produced using conventional ethylene/propylene polymerization technology as disclosed for example in U.S. Pat. No. 6,455,638, incorporated by reference herein in its entirety. The EPDM components may be made using a mono- or bis-cyclopentadienyl, indenyl, or fluorenyl transition metal catalysts or constrained geometry catalysts (CGC) in combination with an activator, in a solution, slurry, or gas phase polymerization process. The catalysts may be mono-cyclopentadienyl, mono-indenyl or mono-fluorenyl CGCs.

Suitable crystalline EPDM elastomers are commercially available. For example, DuPont-Dow offers EPDM elastomers as Nordel® IP NDR 4820 and Nordel® IP NDR 4920. Another exemplary crystalline EPDM elastomer commercially available is BUNA EP T 6470™ from the Lanxess Company which is understood to have an ethylene/propylene ration of about 68/27, namely an ethylene content (units derived from ethylene) of about 68 percent, and a non-conjugated diene content of about 5 percent, wherein said non-conjugated diene is ethylidene norbornene.

The elastomeric composition may include from about 1 phr to about 30 phr of EPDM elastomer. More particularly, the elastomeric composition may include EPDM elastomer from about 3 phr to about 20 phr or from about 5 phr to about 15 phr.

In addition to the aforesaid elastomers, low melting temperature polyamide, and optional EPDM elastomer, the elastomeric composition may also contain other conventional components commonly used in elastomer vulcanizates, for example, tackifier resins, processing aids, carbon black, silica, talc, clay, mica, calcium carbonate, antioxidants, antiozonants, stearic acid, resins, resorcinol, activators, waxes and oils as may be desired.

Fillers such as carbon black and/or silica may be used in a range, for example, of about 20 to 100 phr. The low melting temperature polyamide may substitute for a portion or all of the carbon black and/or silica filler without diminishing the physical properties of the tire.

The vulcanization of the elastomeric compound is conducted in the presence of vulcanizing agents, such as a sulfur containing curing agent and/or a non-sulfur containing curing agent. Examples of suitable sulfur containing curing agents include elemental sulfur (free sulfur) or sulfur donating curing agents, for example, an amine disulfide, polymeric disulfide or sulfur olefin adducts. In one embodiment, the sulfur containing curing agent is elemental sulfur. As known to those skilled in the art, sulfur containing curing agents are used in an amount ranging from about 0.2 phr to about 5.0 phr or in a range of from about 0.5 phr to about 3.0 phr.

Additional non-sulfur containing curing agents may also be used. Methylene donors are an example of non-sulfur containing curing agents that may improve the bonding between the low melting temperature polyamide and the elastomer components. Examples of methylene donors that are suitable for use in the present invention include hexamethylenetetramine ("HMTA"), hexaethoxymethylmelamine, hexamethoxymethylmelamine ("HMMM"), lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines of the general formula:

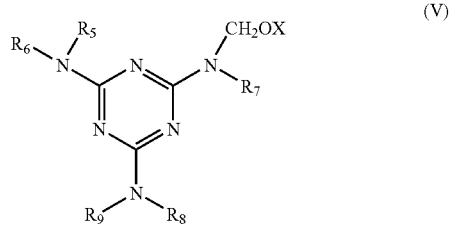

(V)

wherein X is an alkyl having from 1 to 8 carbon atoms, and $R_5$, $R_6$, $R_7$, $R_8$, and $R_9$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine, N,N'N"-tributyl-N,N',N"-trimethylol-melamine, and hexamethoxymethylmelamine. The N-methylol derivatives of melamine are prepared by known methods.

Another non-sulfur containing curing agent that may be utilized in the present invention are methylene acceptors. Examples of methylene acceptors that are suitable for use in the present invention include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof.

Another non-sulfur containing curing agent that may be utilized in the present invention is N-N'-m phenylenedimaleimide ("HVA-2"). N-N'-m phenylenedimaleimide may be present at various levels in the rubber compounds disclosed herein. For example, the level of N-N'-m phenylenedimaleimide may range from about 0.1 phr to about 10.0 phr, or in a range of about 0.5 phr to about 5.0 phr.

Other examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

Accelerators are used to control the time and/or temperature required for vulcanization and to improve the properties of the vulcanizate. A single accelerator system may be used, i.e., primary accelerator in conventional amounts ranging from about 0.5 to 5.0 phr. In the alternative, combinations of 2 or more accelerators may be used which may consist of a primary accelerator which is generally used in the larger amount (0.3 to 5.0 phr), and a secondary accelerator which is generally used in smaller amounts (0.05 to 1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not affected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. In one embodiment, the primary accelerator is a disulfide or sulfenamide.

Various synthetic, amorphous silicas may be used for the tire innerliner composition, where it is desired that the innerliner composition contains a silica. Representative of such silicas are, for example and not intended to be limiting, precipitated silicas as, for example, HiSil 210™ and HiSil 243™ from PPG Industries, as well as various precipitated silicas from J.M. Huber Company, various precipitated silicas from Degussa Company and various precipitated silicas from Rhodia Company. Silica may be used in a range from about 10 phr to about 80 phr or, alternatively, from about 20 phr to about 40 phr.

Various coupling agents may be used for various synthetic, amorphous silicas, particularly the precipitated silicas, to couple the silica aggregates to various of the elastomers. Representative of such coupling agents are, for example and not intended to be limiting, bis(3-trialkoxysilylpropyl) polysulfides wherein at least two, and optionally all three, of its alkoxy groups are ethoxy groups and its polysulfidic bridge is comprised of an average of from about 2 to about 4, alternatively from about 2 to about 2.6 or an average of from about 3.4 to about 3.8 connecting sulfur atoms, and alkoxyorganomercaptosilane which may be optionally have its mercapto moiety blocked with a suitable blocking agent during the mixing thereof with the elastomeric composition, wherein said alkoxy group is preferably an ethoxy group. In one embodiment, the coupling agent is a 50/50 (by weight) composite of carbon black (N330) and bis-(3-triethoxysilylpropyl) disulfide material from Degussa A.G. Coupling agents may be used in a range of about 1 phr to about 10 phr and more particularly at about 5 phr.

The elastomeric composition may also include a material that acts as a compatibilizer between the elastomeric component and the low melting temperature polyamide component. Suitable compatibilizers include phenol resins combined with metal salt catalysts. In one embodiment, the compatibilizer is a methylphenol resin and stannous chloride. Other suitable compatibilizers include methylene donor/methylene acceptor pairs, discussed individually above. In one embodiment, the methylene donor/methylene acceptor-type compatibilizer is resorcinol and hexamethylenetetramine.

The mixing of the elastomeric composition can be accomplished by methods known to those having skill in the elastomer mixing art. For example, ingredients are typically mixed in at least two stages, namely, at least one non-productive stage followed by a productive mix stage.

The non-productive stage may be divided into multiple steps wherein different components are sequentially mixed together into master batches which are then mixed prior to the productive stage. Mixing during the non-productive stage is usually carried out over about 3 minutes to about 5 minutes. During this mixing stage, the elastomeric composition is allowed to reach and maintain a temperature sufficient to melt the low melting temperature polyamide. The elastomeric composition may be allowed to reach temperatures in the range of about 120° C. to about 180° C. The elastomeric composition may be heated by the interaction of the various components of the elastomeric composition, which is an exothermic reaction that can generate enough heat to raise the temperature of the resulting composition high enough to melt the low melting temperature polyamide. However, under conditions wherein the mixture does not produce sufficient levels of heat to melt the low melting temperature polyamide, external sources of heat may be applied, such as, without limitation, hot water heaters, steam heaters, or electrical heaters.

The final curatives including sulfur-curing agents and/or non-sulfur containing curing agents are typically mixed in the final stage which is conventionally called the "productive" mix stage in which the mixing typically occurs at a temperature, or ultimate temperature, lower than the mix temperature(s) than the preceding non-productive mix stage(s). For example, the elastomeric compositions are mixed for about 2 minutes to about 5 minutes in a temperature range of about 100° C. to about 110° C. The terms "non-productive" and "productive" mix stages are well known to those having skill in the elastomer mixing art.

One aspect of the present invention is that the low melting temperature of the polyamide allows the melting and dispersal of the polyamide in the elastomeric composition at temperatures that do not damage other components of the elastomeric composition, and thus removing the need for an additional melting step. As discussed above, the elastomeric composition is mixed in a range of about 120° C. to about 180° C. The heat required to melt the polyamide of the elastomeric composition may be supplied by the exothermic mixing of the rubber components, or may be supplied by an external source, such as hot water, steam, or electrical heaters.

After completion of the productive mix step, the elastomeric composition may be sent to a mixing mill where it is kneaded. Then, depending on the tire component being built, the elastomeric composition may be sent to a calender for wire coating, or an extruder for forming sidewall, apex, EMT insert, wedge, gum strip, or treadbase. The tire components are then used to build a tire using standard tire building techniques as known to those having ordinary skill in the art of building tires.

Vulcanization of the tire of the present invention is generally carried out, for example, at temperatures of between about 100° C. and 200° C. The vulcanization may be conducted at temperatures ranging from about 110° C. to 180° C. Any of the usual vulcanization processes may be used such as heating in a press or mold, heating with superheated steam or hot salt or in a salt bath, as known to those having skill in the art. The heating may be accomplished in a press or mold in a method known to those skilled in the art of tire curing.

As a result of vulcanization, the at least one tire component becomes an integral part of the tire by being co-cured therewith. Thus, in accordance with this invention, a pneumatic rubber tire is provided having at least one tire component, namely, a sidewall, apex, treadbase, Extended Mobility Tire insert ("EMT insert"), wedge, gum strip, wire coat or any tire component wherein the increased stiffness, resistance to tearing, flex fatigue, and/or ozone weathering are desired, that comprises a vulcanized elastomer layer composition comprised of said elastomeric composition, including an elastomer, a low melting temperature nylon and an optional EPDM elastomer.

The invention may be better understood in light of the following examples in which the parts and percentages are by weight unless otherwise indicated.

Example I

In this example, the effect of dispersing a low melting temperature polyamide in an elastomeric composition using standard curing techniques for use in a tire sidewall is demonstrated. All amounts are in parts by weight. As shown in table 1, the elastomeric compositions were mixed using a three phase mixing procedure. The elastomers, polyamide, carbon black, wax, antioxidants, resin, stearic acid, and zinc oxide were mixed together in a first non-productive step, and silica, silica coupler, and oil were added in a second non-productive step. The non-productive mixing step was allowed to proceed for 3 minutes to 5 minutes and was allowed to reach a temperature of 160° C. to 180° C. Heat generated by the mixing to the components of the composition was sufficient to raise the temperature level to this range. Conventional amounts of curatives were added in a subsequent, productive mixing step, to obtain a compound with a dispersed polyamide in the elastomer. The productive mixing step was carried out over 2 minutes to 3 minutes to a temperature of about 110° C.

TABLE 1

| Material | Sample A Control | Sample B | Sample C | Sample D | Sample E |
| --- | --- | --- | --- | --- | --- |
| First Non-productive mixing | | | | | |
| Natural rubber elastomer[1] | 50 | 50 | 50 | 50 | 50 |
| Cis 1,4-polybutadiene elastomer[2] | 50 | 50 | 50 | 50 | 50 |
| Low melting (115° C.) polyamide[3] | 0 | 0 | 0 | 10 | 20 |
| Low melting (154° C.) polyamide[4] | 0 | 10 | 20 | 0 | 0 |
| Carbon Black[5], N550 | 30 | 30 | 30 | 30 | 30 |
| Wax[9] | 1.5 | 1.5 | 1.5 | 1.5 | 1.5 |
| Antioxidants[10] | 6 | 6 | 6 | 6 | 6 |
| Resin[11] | 5 | 5 | 5 | 5 | 5 |
| Stearic acid | 1 | 1 | 1 | 1 | 1 |
| Zinc oxide | 3 | 3 | 3 | 3 | 3 |
| Second Non-productive mixing | | | | | |
| Silica[6] | 30 | 30 | 30 | 30 | 30 |
| Silica coupler[7] | 5 | 5 | 5 | 5 | 5 |
| Oil[8] | 2 | 2 | 2 | 2 | 2 |
| Productive mixing | | | | | |
| Sulfur | 1.5 | 1.5 | 1.5 | 1.5 | 1.5 |
| Accelerator[12] | 1.45 | 1.45 | 1.45 | 1.45 | 1.45 |

[1]Natural rubber SMR-20 or SMR-5
[2]Cis 1,4-polybutadiene elastomer, reported above on a dry weight basis, having a high cis 1,4-content of at least 95 percent and having a Tg of about −100° C. as Budene ® 1254 from The Goodyear Tire & Rubber Company (oil extended with 25 phr of aromatic rubber processing oil per 100 parts by weight of the rubber).
[3]Low melting (115° C.) polyamide as Elvamide 8066 from DuPont Engineering Polymers.
[4]Low melting (154° C.) polyamide as Elvamide 8023R from DuPont Engineering Polymers.
[5]Carbon black N550 (ASTM designation) carbon black having an Iodine number of about 43 with a DBP value of about 121.
[6]Silica as HI-SIL 210 KS300 from PPG Industries which is synthetic, hydrated, amorphous, precipitated conventional silica with surface area of 135.
[7]A 50/50 (by weight) composite of carbon black (N330) and bis-(3-triethoxysilylpropyl) disulfide material from Degussa A. G.
[8]Rubber processing oil
[9]A mixture of microcrystalline and paraffin waxes
[10]Antioxidants have N-(1,3 dimethyl butyl)-N'-phenyl-p-phenylene diamine and Polymerized 1,2-dihydro-2,2,4 trimethylquinoline
[11]Non-staining, unreactive 100% phenol formaldehyde resin
[12]Accelerator as a sulfenamide The prepared elastomeric compositions were cured at a temperature of about 170° C. for about 12 minutes and the resulting cured elastomeric composition samples were evaluated for their physical properties as shown below in Table 2.

TABLE 2

| Material | Sample A Control | Sample B | Sample C | Sample D | Sample E |
|---|---|---|---|---|---|
| Natural rubber elastomer | 50 | 50 | 50 | 50 | 50 |
| Cis 1,4-polybutadiene elastomer | 50 | 50 | 50 | 50 | 50 |
| Low melting (115° C.) Nylon | 0 | 0 | 0 | 10 | 20 |
| Low melting (154° C.) Nylon | 0 | 10 | 20 | 0 | 0 |
| 100% Modulus, MPa[1] | 1.43 | 2.14 | 2.77 | 2.18 | 2.78 |
| 300% Modulus, MPa | 6.64 | 8.28 | 9.42 | 8.21 | 8.75 |
| Tensile Strength, MPa | 15.9 | 13.8 | 13.7 | 14.9 | 14.1 |
| Ultimate Elongation (%) | 609 | 504 | 466 | 545 | 517 |
| Shore A hardness (23° C.)[2] | 63 | 71 | 75 | 73 | 76 |
| Shore A hardness (100° C.) | 57 | 62 | 64 | 61 | 61 |
| Zwick Rebound at 23° C.[3] | 44.0 | 42 | 40.8 | 41.2 | 38 |
| Zwick Rebound at 100° C. | 52.5 | 51.5 | 50.6 | 51.3 | 49.3 |
| Original tear strength at 23° C., N[4] | 254 | 159 | 141 | 163 | 163 |
| Original tear strength at 95° C., N | 220 | 127 | 191 | 136 | 235 |
| Aged (7D70 C.)tear strength at 95° C., N | 98 | 52 | 51 | 59 | 98 |
| Cut-growth rate at 23° C., min/mm[5] | 220 | 65 | 97 | 115 | 62 |
| Cut-growth rate at 95° C., min/mm | 284 | 73 | 91 | 70 | 66 |
| Cyclic Fatigue average Cycles X100 | 584 | 394 | 305 | 481 | 796 |
| DIN abrasion RVL | 102 | 116 | 117 | 114 | 114 |

[1]Data obtained according to Automated Testing System (ATS) instrument by the Instron Corporation which incorporates six tests in one system. Such instrument may determine ultimate tensile, ultimate elongation, modulii, etc. Data reported in the Table is generated by running the ring tensile test station which is an Instron 4201 load frame based on ASTM D 412.
[2]ASTM D2240
[3]ASTM D1054
[4]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[5]ASTM D813
[6]ASTM D4482
[7]Data obtained according to DIN 53516 abrasion resistance test procedure using a Zwick drum abrasion unit, Model 6102 with 2.5 Newtons force. DIN standards are German test standards. The DIN abrasion results are reported as relative values to a control rubber composition used by the laboratory.

From table 2 it can be seen that the addition of low melting temperature polyamide using standard sulfur curing agents under standard curing conditions improved tear strength and cyclic fatigue in Sample E, however, the overall physical properties of the composition did not improve.

Example II

In this example, the effect of dispersing a low melting temperature polyamide in an elastomeric composition using the curing conditions of the present invention for use in a tire sidewall is demonstrated. All amounts are in parts by weight. Similar to Example I above, and as shown in table 3, the elastomeric compositions were mixed using a three phase mixing procedure. The elastomers, polyamide, carbon black, wax, antioxidants, resin, stearic acid, and zinc oxide were mixed together in a first non-productive step, and silica, silica coupler, and oil were added in a second non-productive step. The non-productive mixing step was allowed to proceed for 3 minutes to 5 minutes and was allowed to reach a temperature of 160° C. to 180° C. Heat generated by the mixing to the components of the composition was sufficient to raise the temperature level to this range. Curing agents, namely sulfur, accelerator, and at least one of HMMM, HMTA, or HVA-2, were added in a subsequent, productive mixing step, to obtain a compound with a dispersed polyamide in the elastomer. The productive mixing step was carried out over 2 minutes to 3 minutes to a temperature of about 110° C.

TABLE 3

| Material | Sample A Control | Sample F | Sample G | Sample H | Sample I |
|---|---|---|---|---|---|
| Non-productive mixing | | | | | |
| Natural rubber elastomer[1] | 50 | 50 | 50 | 50 | 50 |
| Cis 1,4-polybutadiene elastomer[2] | 50 | 50 | 50 | 50 | 50 |
| Low melting (115° C.) polyamide[3] | 0 | 20 | 20 | 20 | 20 |
| Carbon Black[4], N550 | 30 | 30 | 30 | 30 | 30 |
| Wax[8] | 1.5 | 1.5 | 1.5 | 1.5 | 1.5 |
| Antioxidants[9] | 6 | 6 | 6 | 6 | 6 |
| Resin[10] | 5 | 5 | 5 | 5 | 5 |
| Stearic acid | 1 | 1 | 1 | 1 | 1 |
| Zinc oxide | 3 | 3 | 3 | 3 | 3 |

TABLE 3-continued

| Material | Sample A Control | Sample F | Sample G | Sample H | Sample I |
|---|---|---|---|---|---|
| Second Non-productive mixing | | | | | |
| Silica[5] | 30 | 30 | 30 | 30 | 30 |
| Silica coupler[6] | 5 | 5 | 5 | 5 | 5 |
| Oil[7] | 2 | 2 | 2 | 2 | 2 |
| Productive mixing | | | | | |
| Sulfur | 1.5 | 1.0 | 1.0 | 1.0 | 1.0 |
| Accelerator[11] | 1.45 | 1.45 | 1.45 | 1.45 | 1.45 |
| HMMM[12] | 0 | 0 | 2 | 0 | 0 |
| HMTA[13] | 0 | 0 | 0 | 2 | 2 |
| HVA-2[14] | 0 | 0 | 0 | 0 | 2 |

[1]Natural rubber SMR-20 or SMR-5
[2]Cis 1,4-polybutadiene elastomer, reported above on a dry weight basis, having a high cis 1,4-content of at least 95 percent and having a Tg of about −100° C. as Budene ® 1254 from The Goodyear Tire & Rubber Company (oil extended with 25 phr of aromatic rubber processing oil per 100 parts by weight of the rubber).
[3]Low melting (115° C.) polyamide as Elvamide 8066 from DuPont Engineering Polymers.
[4]Carbon black N550 (ASTM designation) carbon black having an Iodine number of about 43 with a DBP value of about 121.
[5]Silica as HI-SIL 210 KS300 from PPG Industries which is synthetic, hydrated, amorphous, precipitated conventional silica with surface area of 135.
[6]A 50/50 (by weight) composite of carbon black (N330) and bis-(3-triethoxysilypropyl) disulfide material from Degussa A. G.
[7]Rubber processing oil
[8]A mixture of microcrystalline and paraffin waxes
[9]Antioxidants have N-(1,3 dimethyl butyl)-N'-phenyl-p-phenylene diamine and Polymerized 1,2-dihydro-2,2,4 trimethylquinoline
[10]Non-staining, unreactive 100% phenol formaldehyde resin
[11]Accelerator as a sulfenamide
[12]Hexamethoxymethylmelamine
[13]hexamethylene-tetramine
[14]N-N'-m phenylenediamaleimide The prepared elastomeric compositions were cured at a temperature of about 170° C. for about 12 minutes and the resulting cured elastomeric composition samples were evaluated for their physical properties as shown below in Table 4. The elastomeric composition Samples A and F correspond to Samples A and F of Table 1.

TABLE 4

| Material | Sample A Control | Sample F | Sample G | Sample H | Sample I |
|---|---|---|---|---|---|
| Low melting (115° C.) polyamide | 0 | 20 | 20 | 20 | 20 |
| Productive mixing | | | | | |
| Sulfur | 1.5 | 1.0 | 1.0 | 1.0 | 1.0 |
| Accelerator[9] | 1.45 | 1.45 | 1.45 | 1.45 | 1.45 |
| HMMM[13] | 0 | 0 | 2 | 0 | 0 |
| HMTA[14] | 0 | 0 | 0 | 2 | 2 |
| HVA-2[15] | 0 | 0 | 0 | 0 | 2 |
| 100% Modulus, MPa[1] | 1.43 | 2.35 | 2.41 | 2.45 | 2.62 |
| 300% Modulus, MPa | 6.64 | 7.57 | 8.22 | 8.20 | 8.83 |
| Tensile Strength, MPa | 15.9 | 13.1 | 12.6 | 14.4 | 12.9 |
| Ultimate Elongation (%) | 609 | 539 | 467 | 547 | 467 |
| Shore A hardness (23° C.)[2] | 63 | 75 | 75 | 75 | 78 |
| Shore A hardness (100° C.) | 57 | 58 | 59 | 61 | 61 |
| Zwick Rebound at 23° C.[3] | 44.0 | 37 | 38 | 39 | 39.3 |
| Zwick Rebound at 100° C. | 52.5 | 46.6 | 45.5 | 46.7 | 44 |
| Original tear strength at 23° C., N[4] | 254 | 226 | 222 | 231 | 171 |
| Original tear strength at 95° C., N | 220 | 256 | 234 | 233 | >212 |
| Aged (7D70° C.) tear strength at 95° C., N | 98 | 192 | 208 | 185 | 221 |
| Cut-growth rate at 23° C., min/mm[5] | 220 | 370 | 333 | 258 | 354 |
| Cut-growth rate at 95° C., min/mm | 284 | 478 | 636 | 649 | 512 |

TABLE 4-continued

| Material | Sample A Control | Sample F | Sample G | Sample H | Sample I |
|---|---|---|---|---|---|
| Cyclic Fatigue average Cycles X100 | 584 | 321 | 362 | 755 | 992 |
| DIN abrasion RVL | 102 | 108 | 98 | 103 | 96 |

[1]Data obtained according to Automated Testing System (ATS) instrument by the Instron Corporation which incorporates six tests in one system. Such instrument may determine ultimate tensile, ultimate elongation, modulii, etc. Data reported in the Table is generated by running the ring tensile test station which is an Instron 4201 load frame based on ASTM D 412.
[2]ASTM D2240
[3]ASTM D1054
[4]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[5]ASTM D813
[6]ASTM D4482
[7]Data obtained according to DIN 53516 abrasion resistance test procedure using a Zwick drum abrasion unit, Model 6102 with 2.5 Newtons force. DIN standards are German test standards. The DIN abrasion results are reported as relative values to a control rubber composition used by the laboratory.

As shown in table 4, using the curing conditions of the present invention wherein one or more additional curing agents, HMMM, HMTA, or HVA-2, (sulfur being the primary curing agent), improved the physical properties of the elastomeric composition. Specifically, the addition of 20 phr low melting (115° C.) polyamide to an elastomeric composition subsequently cured using the curing conditions of the present invention, had increased modulus, hardness, tear strength, aged tear strength, and cut growth rate.

Example III

In this example, the effect of dispersing a low melting temperature polyamide in an elastomeric composition using the curing conditions of the present inventions for use as an apex, EMT-insert, treadbase, or tire component wherein stiffness is desired, is demonstrated. All amounts are in parts by weight. As shown below in table 5, the elastomeric compositions were mixed using a three phase mixing procedure. The elastomers, polyamide, partial carbon black, partial oil, resin, stearic acid, and zinc oxide were mixed together in a first non-productive step, and partial carbon black, partial oil, and resorcinol were added in a second non-productive step. The non-productive mixing step was allowed to proceed for 3 minutes to 5 minutes and was allowed to reach a temperature of 160° C. to 180° C. Heat generated by the mixing to the components of the composition was sufficient to raise the temperature level to this range. Curatives, sulfur, accelerator, and at least one of HMMM or HMTA, were added in a subsequent, productive mixing step, to obtain a compound with a dispersed polyamide in the elastomer. The productive mixing step was carried out over 2 minutes to 3 minutes to a temperature of about 110° C.

TABLE 5

| Material | Sample J Control | Sample K No Nylon | Sample L 20 phr | Sample M 25 phr |
|---|---|---|---|---|
| Non-productive mixing | | | | |
| Natural rubber elastomer[1] | 80 | 80 | 80 | 80 |
| Cis 1,4-polybutadiene elastomer[2] | 20 | 20 | 20 | 20 |
| Low melting (115° C.) polyamide[3] | 0 | 0 | 20 | 25 |
| Carbon Black[4], N326 | 68 | 60 | 60 | 60 |
| Carbon Black[5], N550 | 24 | 0 | 0 | 0 |
| Oil[6] | 9.5 | 5 | 5 | 5 |
| Resorcinol[7] | 4 | 4 | 4 | 4 |
| Resin[8] | 0 | 2 | 2 | 2 |
| Stearic acid | 1 | 1 | 1 | 1 |
| Zinc oxide | 5 | 5 | 5 | 5 |
| Productive mixing | | | | |
| Sulfur | 4 | 3 | 3 | 3 |
| Accelerator[9] | 1.9 | 2 | 2 | 2 |
| HMTA[10] | 0 | 3 | 3 | 3 |
| HMMM[11] | 5.56 | 5.56 | 5.56 | 5.56 |

[1]Natural rubber SMR-20 or SMR-5
[2]Cis 1,4-polybutadiene elastomer, reported above on a dry weight basis, having a high cis 1,4-content of at least 95 percent and having a Tg of about −100° C. as Budene ® 1254 from The Goodyear Tire & Rubber Company (oil extended with 25 phr of aromatic rubber processing oil per 100 parts by weight of the rubber).
[3]Low melting (115° C.) polyamide as Elvamide 8066 from DuPont Engineering Polymers.
[4]Carbon black N326 (ASTM designation) carbon black having an Iodine number of about 82 with a DBP value of about 72.
[5]Carbon black N550 (ASTM designation) carbon black having an Iodine number of about 43 with a DBP value of about 121.
[6]Rubber processing oil
[7]Resorcinal
[8]Unreactive 100% phenol formaldehyde resin
[9]Accelerator as a sulfenamide
[10]Hexamethylene-tetramine
[11]72% activity Hexamethoxymethylmelamine The prepared elastomeric compositions were cured at a temperature of about 170° C. for about 12 minutes and the resulting cured elastomeric composition samples were evaluated for their physical properties as shown below in Table 6.

TABLE 6

| Material | Sample J Control | Sample K No Nylon | Sample L 20 phr | Sample M 25 phr |
|---|---|---|---|---|
| DeMattia Fatigue resistance at 100° C. | control | much better | much better | much better |
| Crack growth rate (mm/10,000 cycles) | 25 | <<0.1 | <0.2 | <0.1 |

TABLE 6-continued

| Material | Sample J Control | Sample K No Nylon | Sample L 20 phr | Sample M 25 phr |
| --- | --- | --- | --- | --- |
| Total crack growth over 50,000 cycles (mm) | 25[30] | ~1 | ~2 | ~4 |
| Original tear strength at 95° C., N | 12 | 24 | 44 | 125 |
| Adhesion to Ply compd at 95° C., N | 7 | 27 | 58 | 59 |
| Zwick Rebound at 65° C. | 47 | 59 | 48 | 48 |
| Zwick Rebound at 95° C. | 51 | 62 | 52 | 52 |
| Zwick Rebound at 120° C. | 54 | 65 | 54 | 54 |
| Zwick Rebound at 150° C. | 55 | 65 | 54 | 55 |
| Tan delta at 1%, 11 Hz, 40° C. | 0.072 | 0.084 | 0.104 | 0.107 |
| Tan delta at 10% 11 Hz, 100° C. | 0.215 | 0.172 | 0.135 | 0.154 |
| Tensile properties at 23° C. | | | | |
| 50% Modulus, MPa | 6.90 | 4.53 | 8.32 | 8.7 |
| 100% Modulus, MPa | 12.8 | 7.74 | 12.3 | 12.6 |
| 200% Modulus, MPa | 25.3 | 18.3 | 20.2 | 20.2 |
| 300% Modulus, MPa | | 30.0 | 28.3 | 28.1 |
| Tensile Strength, MPa | 34.2 | 40.5 | 31.2 | 29.9 |
| Ultimate Elongation (%) | 292 | 413 | 340 | 327 |
| Shore A hardness (23° C.) | 89 | 83 | 86 | 87 |
| Tensile properties at 60° C. | | | | |
| 50% Modulus, MPa | 6.3 | 4.37 | 5.87 | 5.95 |
| 100% Modulus, MPa | 11.1 | 7.23 | 8.7 | 8.7 |
| 200% Modulus, MPa | 20.7 | 16 | 14.5 | 14.2 |
| 300% Modulus, MPa | 26.9 | 26.1 | 20.5 | 19.5 |
| Tensile Strength, MPa | 28.0 | 33.3 | 26.5 | 25.6 |
| Ultimate Elongation (%) | 322 | 385 | 445 | 473 |
| Tensile properties at 100° C. | | | | |
| 50% Modulus, MPa | 6.4 | 4.05 | 4.81 | 5.0 |
| 100% Modulus, MPa | 10.5 | 6.43 | 6.93 | 7.1 |
| 200% Modulus, MPa | 18.5 | 13 | 11.0 | 10.9 |
| 300% Modulus, MPa | | 20.0 | 14.0 | 13.1 |
| Tensile Strength, MPa | 21.3 | 27.5 | 20.5 | 20 |
| Ultimate Elongation (%) | 271 | 576 | 749 | 793 |
| Shore A hardness (100° C.) | 87 | 80 | 79 | 80 |
| Compression modulus at 23° C. | | | | |
| 10% Modulus, MPa | 3.39 | 1.67 | 2.5 | 2.84 |
| 20% Modulus, MPa | 5.05 | 2.17 | 3.21 | 3.66 |
| 30% Modulus, MPa | 6.96 | 3.73 | 5.55 | 6.35 |
| 40% Modulus, MPa | 9.75 | 5.22 | 7.72 | 8.78 |
| Compression modulus at 100° C. | | | | |
| 10% Modulus, MPa | 3.57 | 2.16 | 2.06 | 2.23 |
| 20% Modulus, MPa | 4.27 | 2.65 | 2.62 | 2.85 |
| 30% Modulus, MPa | 5.82 | 3.74 | 3.91 | 4.31 |
| 40% Modulus, MPa | 7.94 | 5.25 | 5.59 | 6.2 |

[30]Cut growth reach maximum after only 10,000 cycles.

As can be seen in Table 6, the addition of polyamide to a tire component cured using the conditions of the present invention improves stiffness, fatigue resistance, tear strength, tan delta, tensile properties, and ultimate elongation at 60° C. and 100° C. The relatively high stiffness of the control tire (Sample J) is conferred by the greater parts by weight carbon black. The high carbon black concentration increases stiffness at the expense of decreasing fatigue resistance when compared to Sample K, a less stiff composition with less carbon black. As seen with Samples L and M, the addition of polyamide to the low carbon black compositions improves the stiffness as compared to the Sample J and the fatigue resistance as compared to Sample K.

Example IV

In this example, the effect of dispersing a low melting temperature polyamide in a thermoplastic elastomer using the curing conditions of the present invention for use in tire components wherein stiffness is desired, is demonstrated. All amounts are in parts by weight. Samples A and J were prepared as described above in Examples I-III. As shown in table 7, the elastomeric compositions were mixed using a two phase mixing procedure having a non-productive mixing phase and a productive mixing phase. For Samples, M, O, P, and Q, the sequence of mixing was varied. For Samples M, O, and P, the polyamide was melted by heating with an external heating source to a range of about 120° C. to about 125° C. Nano-clay and carbon black were then mixed with the melted polyamide. Next, the elastomer and fillers were added to the mixture, wherein the temperature was maintained at about 120° C. by the heat released by the reaction of the various components. For Sample Q, which has the same ingredients as Sample P, the carbon black and elastomer were first mixed in an elastomer master batch. Then, the polyamide was melted as above and mixed with the nano-clay, and then the master batch was added to this mixture. Curatives, sulfur, accelerator, and HMMM were added in a subsequent, productive mixing step at a temperature of about 110° C., to obtain a compound with a dispersed polyamide in the elastomer.

TABLE 7

| Material | Sample A Control | Sample J | Sample M | Sample O | Sample P | Sample Q |
|---|---|---|---|---|---|---|
| Non-productive mixing | | | | | | |
| Natural rubber elastomer[1] | 50 | 80 | 100 | 100 | 100 | 100 |
| Cis 1,4-polybutadiene elastomer[2] | 50 | 20 | 0 | 0 | 0 | 0 |
| Low melting (115° C.) polyamide[3] | 0 | 0 | 66.7 | 66.7 | 66.7 | 66.7 |
| Nano-clay[4] | 0 | 7.8 | 7.8 | 7.8 | 7.8 | 7.8 |
| Carbon Black[5], N326 | 0 | 68 | 0 | 0 | 0 | 0 |
| Carbon Black[6], N550 | 30 | 24 | 0 | 0 | 0 | 0 |
| Carbon Black[7], N660 | 0 | 0 | 0 | 0 | 30 | 30 |
| Silica[8] | 30 | 0 | 0 | 0 | 0 | 0 |
| Silica coupler[9] | 5 | 0 | 0 | 0 | 0 | 0 |
| Oil[10] | 2 | 9.5 | 0 | 0 | 0 | 0 |
| Wax[11] | 1.5 | 0 | 0 | 0 | 0 | 0 |
| Antioxidants[12] | 6 | 0 | 2 | 2 | 2 | 2 |
| Resin[13] | 5 | 0 | 0 | 0 | 0 | 0 |
| PR Resin[14] | 5 | 0 | 15 | 15 | 15 | 15 |
| Resorcinol[15] | 0 | 0 | 0 | 4 | 4 | 4 |
| Stearic acid | 1 | 1 | 2 | 2 | 2 | 2 |
| Zinc oxide | 3 | 5 | 3 | 3 | 3 | 3 |
| Productive mixing | | | | | | |
| Sulfur | 1.5 | 4 | 1 | 1 | 1 | 1 |
| Accelerator[16] | 1.45 | 1.9 | 1 | 1 | 1 | 1 |
| HMMM[17] | 0 | 5.56 | 0 | 5.56 | 5.56 | 5.56 |

[1]Natural rubber SMR-20 or SMR-5
[2]Cis 1,4-polybutadiene elastomer, reported above on a dry weight basis, having a high cis 1,4-content of at least 95 percent and having and a Tg of about −100° C. as Budene ® 1254 from The Goodyear Tire & Rubber Company (oil extended with 25 phr of aromatic rubber processing oil per 100 parts by weight of the rubber).
[3]Low melting (115° C.) polyamide as Elvamide 8066 from DuPont Engineering Polymers.
[4]Surface modified clay, such as Nanomer I.30T from Naocor
[5]Carbon black N326 (ASTM designation) carbon black having an Iodine number of about 82 with a DBP value of about 72.
[6]Carbon black N550 (ASTM designation) carbon black having an Iodine number of about 43 with a DBP value of about 121.
[7]Carbon black N660 (ASTM designation) carbon black having an Iodine number of about 36 with a DBP value of about 90.
[8]Silica as HI-SIL 210 KS300 from PPG Industries which is synthetic, hydrated, amorphous, precipitated conventional silica with surface area of 135.
[9]A 50/50 (by weight) composite of carbon black (N330) and bis-(3-triethoxysilypropyl) disulfide material from Degussa A. G., identified as X266S and reported in Table IV as the composite.
[10]Rubber processing oil
[11]A mixture of microcrystalline and paraffin waxes
[12]Antioxidants have N-(1,3 dimethyl butyl)-N'-phenyl-p-phenylene diamine and Polymerized 1,2-dihydro-2,2,4 trimethylquinoline
[13]Non-staining, unreactive 100% phenol formaldehyde resin
[14]Alkylphenolformaldehyde resin
[15]Resorcinol
[16]Accelerator as a sulfenamide
[17]72% activity Hexamethoxymethylmelamine The prepared elastomeric compositions were cured at a temperature of about 170° C. for about 12 minutes and the resulting cured elastomer composition samples were evaluated for their physical properties as shown below in Table 8.

TABLE 8

| Material | Sample A Control | Sample J Control | Sample M | Sample O | Sample P | Sample Q |
|---|---|---|---|---|---|---|
| 50% Modulus, MPa | — | 6.9 | 6.5 | 9.5 | 7.7 | 9.3 |
| 100% Modulus, MPa | 1.43 | 12.8 | 8.65 | 11.5 | 11.1 | 11.8 |
| 300% Modulus, MPa | 6.64 | 0 | 19.0 | 23.9 | 26.4 | 27.7 |
| Tensile Strength, MPa | 15.9 | 34.2 | 30.8 | 30.0 | 30.2 | 39.6 |
| Ultimate Elongation (%) | 609 | 292 | 435 | 363 | 333 | 395 |
| Shore A hardness (23° C.) | 63 | 89 | 65 | 65 | 72 | 72 |
| Zwick Rebound at 23° C. | 44.0 | — | 32 | 40 | 34 | 38 |

As seen in Table 8, the sequential addition of carbon black to the elastomer to make a master batch, and then mixing the nano-clay with the polyamide prior to mixing with the master batch, resulted in a much stronger elastomeric composition.

Example V

In this example, the effect of dispersing a low melting temperature polyamide and an EPDM elastomer in an elastomeric composition for use in tire components wherein stiffness and ozone resistance is desired is demonstrated. All amounts are in parts by weight. As shown in table 9, the elastomeric compositions were mixed using a two phase mixing procedure having a non-productive mixing phase and a productive mixing phase. The elastomers, EPDM, polyamide, carbon black, oil, wax, processing aids, fatty acids, antioxidants, antiozoants, and zinc oxide, silica, and silica coupler were added in the non-productive step. The non-productive mixing step was allowed to proceed for 3 minutes to 5 minutes and was allowed to reach a temperature of 160° C. to 180° C. Heat generated by the mixing to the components of the composition was sufficient to raise the temperature level to this range. Conventional amounts of curing agents and accelerator were added in a subsequent, productive mixing step, to obtain a compound with polyamide dispersed in the elastomer. The productive mixing step was carried out over 2 minutes to 3 minutes to a temperature of about 110° C.

TABLE 9

| Non-productive mixing | |
|---|---|
| Natural rubber elastomer | 50 |
| Cis 1,4-polybutadiene elastomer[1] | 50 |
| Carbon black[2] | 30 |
| Silica[3] | 30 |
| Oil, wax, processing aids[4] | 10.5 |
| Fatty acid[5] | 1 |
| Antioxidant, and antiozant[6] | 5.25 |
| Zinc oxide | 2 |
| Low melting (115° C.) polyamide[7] | Variable |
| EPDM[8] | Variable |
| Productive mixing | |
| Sulfur and Accelerator[9] | 1.95 |

[1] Obtained as BUD1207 ™ from the Goodyear Tire & Rubber, Co.
[2] N550, ASTM designation
[3] HiSil 210 from PPG Company
[4] Combination of oil, wax and silica coupling agent
[5] Primarily a blend of palmitic and stearic acids
[6] Amind and quinoline types
[7] Polyamide Elvamide 8066, Dupont
[8] Nordel IP NDR 4820, DuPont, 85% ethylene, 4.9% ENB
[9] Sulfur and sulfenamide type accelerator The prepared elastomeric compositions were cured at a temperature of about 170° C. for about 12 minutes and the resulting cured elastomeric composition samples were evaluated for their physical properties as shown below in Table 10.

TABLE 10

| Material | Sample R Control | Sample S | Sample T | Sample U | Sample V | Sample W |
|---|---|---|---|---|---|---|
| Low melting (115° C.) polyamide | 0 | 5 | 0 | 5 | 10 | 15 |
| EPDM | 0 | 0 | 5 | 5 | 10 | 15 |
| Stress-Strain | | | | | | |
| Tensile strength, MPa | 16.4 | 16.0 | 17.3 | 16.6 | 16.0 | 15.0 |
| Elongation at Break, % | 690 | 609 | 684 | 622 | 578 | 531 |
| 100% Modulus, MPa | 1.36 | 2.15 | 1.59 | 2.19 | 2.66 | 3.58 |
| 300% Modulus, MPa | 6.05 | 7.81 | 6.87 | 8.07 | 8.93 | 9.89 |
| Shore A Hardness | | | | | | |
| Room Temp. | 61 | 69 | 62 | 73 | 75 | 81 |
| 100° C. | 53 | 53 | 52 | 51 | 52 | 49 |
| Static Ozone Resistance | | | | | | |
| Crack Density | 1 | 5 | 0 | 5 | 5 | 5 |
| Crack Severity | 1 | 3 | 0 | 1 | 2 | 2 |
| Rank | 2 | 5 | 1 | 3 | 4 | 4 |
| Cut Growth, 4 hours @ 95° C. | | | | | | |
| Min/mm | 40 | 20 | 43 | 22 | 38 | 77 |

As can be seen in Table 10, the addition of both EPDM and low melting temperature polyamide increases the hardness, strength, and ozone resistance of the elastomeric composition.

One having skill in the art will appreciate that the elastomeric compositions presently disclosed may have uses beyond those in the specific tire components discussed herein. For example, the elastomeric compositions may be useful to construct any elastomeric device wherein increased stiffness and resistance to tearing, flex fatigue, and ozone is desired. For example, the elastomeric compositions of the present invention may be used to produce radiator hoses, belts, and other elastomeric products.

While certain representative embodiments and details have been shown for the purpose of illustrating the invention, it will be apparent to those skilled in this art that various changes and modifications may be made therein without departing from the spirit or scope of the invention. Further, it is not the intention of the inventors to restrict or in any way limit the scope of the appended claims to the details as disclosed herein. The invention in its broader aspects is therefore not limited to the specific details, representative apparatus and methods, and illustrative examples shown and described herein.

What is claimed is:

1. A method of producing an elastomeric composition comprising:
    mixing in a non-productive phase 100 parts by weight of at least one elastomer with from 5 to 100 parts by weight, per 100 parts by weight of elastomer (phr) of a polyamide having a melting temperature of less than 120° C. and a crystalline EPDM elastomer;
    allowing the temperature of the low melting temperature polyamide to reach at least its melting temperature; and
    adding in a productive phase to the product of the non-productive phase at least one non-sulfur containing curing agent, wherein the non-sulfur containing curing agent is selected from the group consisting of hexamethoxymethylmelamine, hexamethylene-tetramine, N-N'-m phenylenedimaleimide, and combinations thereof.

2. The method of claim 1 wherein the concentration of polyamide ranges from about 5 phr to about 30 phr.

3. The method of claim 1 wherein the concentration of polyamide ranges from about 55 phr to about 80 phr.

4. The method of claim 1 wherein at least one of a carbon black, an oil, a resin, a fatty acid, a silica, a silica coupler, a wax, an antioxidant, a resin, a stearic acid, nano-clay, resorcinol, or a zinc oxide is added to the composition of the non-productive phase.

5. The method of claim 1 wherein the non-productive stage comprises mixing the elastomer with the carbon black to form a master batch, and mixing the nano-clay with the polyamide, then mixing the nano-clay/polyamide mixture with the master batch.

6. The method of claim 1 wherein the elastomeric composition is formed into a tire component.

7. The method of claim 6 wherein the tire component is selected from the group consisting of sidewall, apex, treadbase, Extended Mobility Tire insert ("EMT insert"), wedge, gum strip, and wire coat.

8. The method of claim 6 further comprising building a tire with the tire component.

9. The method of claim 1 wherein the concentration of crystalline EPDM elastomer ranges from about 1 phr to about 30 phr.

10. The method of claim 9 wherein the concentration of polyamide ranges from about 1 phr to about 30 phr.

11. The method of claim 9 wherein the concentration of polyamide ranges from about 30 phr to about 80 phr.

12. The method of claim 9 wherein the elastomeric composition is formed into a tire component.

13. The method of claim 12 wherein the tire component is selected from the group consisting of sidewall, apex, treadbase, EMT insert, wedge, gum strip, and wire coat.

14. The method of claim 12 further comprising building a tire with the tire component.

15. A tire built comprising the elastomeric composition produced by the method of claim 1.

16. A tire built comprising the elastomeric composition produced by the method of claim 9.

* * * * *

UNITED STATES PATENT AND TRADEMARK OFFICE
CERTIFICATE OF CORRECTION

PATENT NO. : 8,110,619 B2  
APPLICATION NO. : 12/201748  
DATED : February 7, 2012  
INVENTOR(S) : Junling Zhao et al.

Page 1 of 1

It is certified that error appears in the above-identified patent and that said Letters Patent is hereby corrected as shown below:

Column 3, last line "...diene is ethylidene norbomene." to --diene is ethylidene norbornene.--

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

PATENT NO. : 8,110,619 B2  Page 1 of 1
APPLICATION NO. : 12/201748
DATED : February 7, 2012
INVENTOR(S) : Junling Zhao et al.

It is certified that error appears in the above-identified patent and that said Letters Patent is hereby corrected as shown below:

Column 3, line 67, "...diene is ethylidene norbomene." should read --diene is ethylidene norbornene.--

This certificate supersedes the Certificate of Correction issued April 10, 2012.

Signed and Sealed this
First Day of May, 2012

David J. Kappos
*Director of the United States Patent and Trademark Office*